(12) United States Patent
Maeoka et al.

(10) Patent No.: US 7,116,438 B2
(45) Date of Patent: Oct. 3, 2006

(54) TERMINAL FOR INFORMATION PROCESSING

(75) Inventors: Jun Maeoka, Kawasaki (JP); Yoshiaki Morimoto, Kawasaki (JP); Motoaki Satoyama, Sagamihara (JP); Koji Doi, Yokohama (JP); Shinya Iguchi, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 186 days.

(21) Appl. No.: 10/747,267

(22) Filed: Dec. 30, 2003

(65) Prior Publication Data

US 2004/0233621 A1 Nov. 25, 2004

(30) Foreign Application Priority Data

May 22, 2003 (JP) ............................. 2003-144259

(51) Int. Cl.
*G06F 15/00* (2006.01)
*G06F 15/12* (2006.01)

(52) U.S. Cl. ............................. 358/1.15; 348/333.06; 705/50; 715/750

(58) Field of Classification Search ........ 361/679–687, 361/724–727; 348/333.06; 705/50; 345/81; 713/176; 715/750; 358/1.15, 1.16
See application file for complete search history.

(56) References Cited

U.S. PATENT DOCUMENTS

2005/0179938 A1* 8/2005 Kayashima et al. ....... 358/1.15

FOREIGN PATENT DOCUMENTS

| JP | 411119720 A | * | 4/1999 |
| JP | 2002-123466 | | 4/2002 |
| WO | WO 2004/100014 A1 | * | 11/2004 |

* cited by examiner

*Primary Examiner*—Hung Van Duong
(74) *Attorney, Agent, or Firm*—Mattingly, Stanger, Malur & Brundidge, P.C.

(57) ABSTRACT

An electronic notice-board system for allowing information to be contributed to an electronic notice board. A first short-distance communication device carries out communication with the mobile terminal located in a predetermined communication range and a second communication device exchanges data with the mobile terminal after the user of the mobile terminal has been authenticated. Similarly, the mobile terminal also has a short-distance communication device for carrying out communication with the electronic notice board located in a predetermined communication range and a second communication device for exchanging data with the electronic notice board after the user of the mobile terminal has been authenticated. Since users of the electronic notice board must be close by, it is possible to avoid improper use of the electronic notice board by any user located a long distance away from the electronic notice board.

7 Claims, 10 Drawing Sheets

FIG.4

User-information table — 401

| User ID (111) | Password (112) | Mail address (402) |
|---|---|---|
| maeoka | xxxxx | maeoka@xxx.yy.zz |
| doi | yyyyyy | doi@aaa.bb.cc |
| ⋮ | ⋮ | ⋮ |

FIG.5

Content management table — 501

| Content ID (502) | User ID (111) | Display time limit (503) |
|---|---|---|
| 111 | maeoka | 2003/5/12 13:00 |
| 222 | maeoka | 2003/5/12 13:00 |
| 333 | doi | None |
| ⋮ | ⋮ | ⋮ |

FIG.6

Session management table — 601

| Session ID (602) | User ID (111) | No-access lapsing time (603) | Web session ID (604) |
|---|---|---|---|
| s001 | maeoka | 30sec | ws101 |
| s002 | doi | 55sec | ws002 |
| ⋮ | ⋮ | ⋮ | ⋮ |

TERMINAL FOR INFORMATION PROCESSING

BACKGROUND OF THE INVENTION

In general, the present invention relates to an information-processing terminal having a communication function and relates to a system for displaying information on a notice board at a request made by the information-processing terminal. More particularly, the present invention relates to an electronic notice-board system having an information-processing terminal in addition to a display apparatus.

Notice boards in the Internet include an electronic notice board capable of showing contributed news articles and auctions. These news articles and auctions are originated from an information-processing terminal and/or a mobile terminal, which are connected to the Internet. The electronic notice board is disclosed in documents including Japanese Patent Laid-open No. 2002-123466. Japanese Patent Laid-open No. 2002-123466 discloses a notice-board system capable of newly putting an item originated from an external network on a notice board and referencing as well as renewing an item already put on the notice board.

In the conventional electronic notice-board system, from an information-processing terminal and/or a mobile terminal, which are connected to the Internet, it is possible to select a specific notice board provided for a desired theme among notice boards cataloged on a notice-board list without regard to the physical location of a contributor authoring an article of the specific theme. In such an electronic notice-board system, however, it is impossible to specify an electronic board targeted at specific users in accordance with the location of a specific user. Even in the case of specifying a nearby notice board such as a notice board-installed at a train station or a school, the notice board must be specified from a menu displayed on a terminal. In addition, since it is possible to contribute a notice to the notice board from a terminal connectable to the Internet without regard to the physical location of the notice-contributing user, an improper notice is contributed to the notice board sometimes.

SUMMARY OF THE INVENTION

It is thus an object of the present invention to provide an electronic notice-board system that simplifies a command to start use of a nearby notice board and allows only users close to the notice board to contribute an article to the notice board and/or inspect the notice board.

An information-processing terminal according to the present invention comprises an input apparatus for receiving an input entered by the user and an output apparatus for displaying information to the user. In addition, the information-processing terminal also includes a first short-distance communication apparatus for carrying out short-distance communications with a display apparatus and a second communication apparatus for carrying out communications with the display apparatus through a network. To be more specific, the information-processing terminal carries out a processing communication with the display apparatus through the first short-distance communication apparatus in order to start use of the display apparatus, and exchanges data with the display apparatus by way of the second communication apparatus. Thus, it is possible to easily specify a display apparatus serving as an object with which processing is to be carried out.

The information-processing terminal further has a means for selecting an object from those appearing on the display apparatus. Thus, an object appearing on the display apparatus can be specified with ease.

In addition, a display apparatus according to the present invention comprises a first short-distance communication apparatus for carrying out a short-distance communication with an information-processing terminal and a second communication apparatus for carrying out a communication with the information-processing terminal through a network. To be more specific, the display apparatus carries out a processing communication with the information-processing terminal through the first short-distance communication apparatus in order to allow the information apparatus to start use of the display apparatus, and exchanges data with the information-processing terminal by way of the second communication apparatus.

Moreover, a process is carried out to associate information on a communication establishment between the first short-distance communication apparatus and the information-processing terminal with information on a communication establishment between the second communication apparatus and the information-processing terminal. By carrying out this process, it is possible to verify the identity of the same information-processing terminal communicating through another communication path.

BRIEF DESCRIPTION OF THE DRAWINGS

FIG. 4 is a diagram showing the data structure of a user information table;

FIG. 5 is a diagram showing the data structure of a content management table;

FIG. 6 is a diagram showing the data structure of a session management table;

DETAILED DESCRIPTION OF THE PREFERRED EMBODIMENTS

Figure 1:
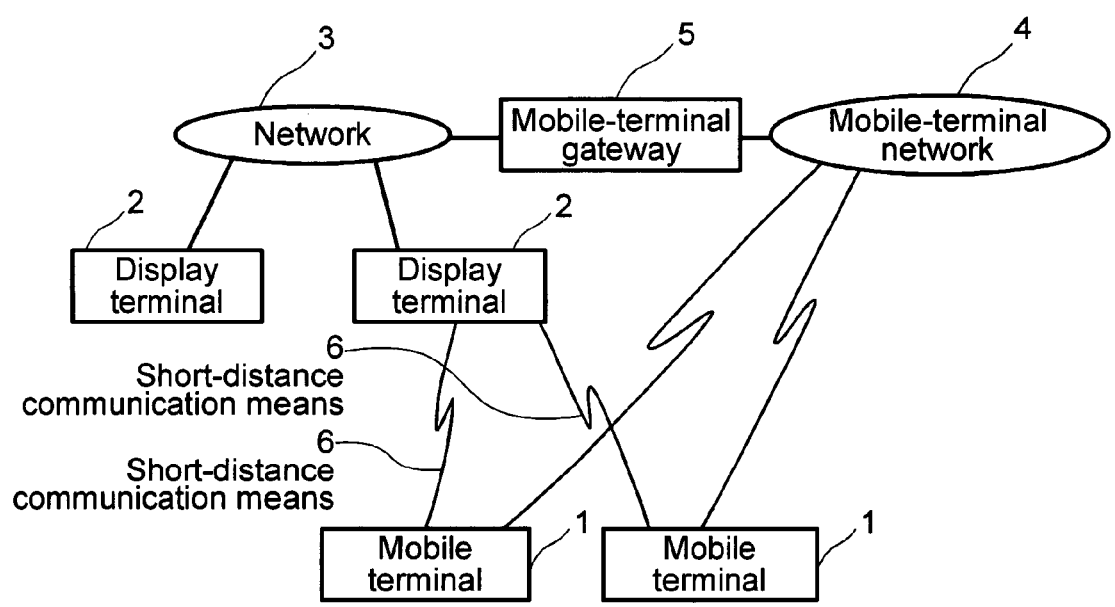
FIG. 1 is a diagram showing an electronic notice-board system comprising display terminals and mobile terminals.

Referring to the drawings, the following description explains a preferred embodiment implementing an electronic notice-board system provided by the present invention. Throughout the description of the embodiment, members common to the descriptions are denoted by the same reference numerals and the common members are each explained only once in order to avoid duplications of explanation.

In the electronic notice-board system implemented by the embodiment, by using a mobile terminal 1, the user contributes a picture to a display terminal 2 for implementing an electronic notice-board function. By using another mobile terminal 1, an inspector can write a comment for a contribution appearing on the display terminal 2.

FIG. 1 is a diagram showing an electronic notice-board system implemented by the embodiment. A mobile terminal 1 is connected to a display terminal 2 by short-distance communication means 6 allowing them to communicate with each other. In addition, a mobile terminal 1 and a display terminal 2 are capable of communicating with each other through a mobile-terminal network 4, a mobile-terminal gateway 5 and a network 3. Data is exchanged between the mobile-terminal network,4 and the network 3 by way of the mobile-terminal gateway 5.

Examples of the mobile terminal 1 are information-processing terminals such as a mobile telephone and a PDA. However, the mobile terminal 1 is not limited to these examples. That is to say, the mobile terminal 1 can be any information-processing terminal as long as the terminal is capable of communicating information. An example of the network 3 is the Internet even though any communication means can be used as the network 3 as long as the communication means is capable of carrying out communications. Examples of the mobile-terminal network 4 are a radio network of mobile telephones and a PHS radio network. However, the mobile-terminal network 4 can be any communication means as long as the communication means is capable of carrying out radio mutual communications. Examples of the short-distance communication means 6 are an infrared ray and a radio LAN. However, the short-distance communication means 6 can be any communication means as long as the communication means is a short-distance communication means capable of carrying out short-distance communications.

Figure 2:
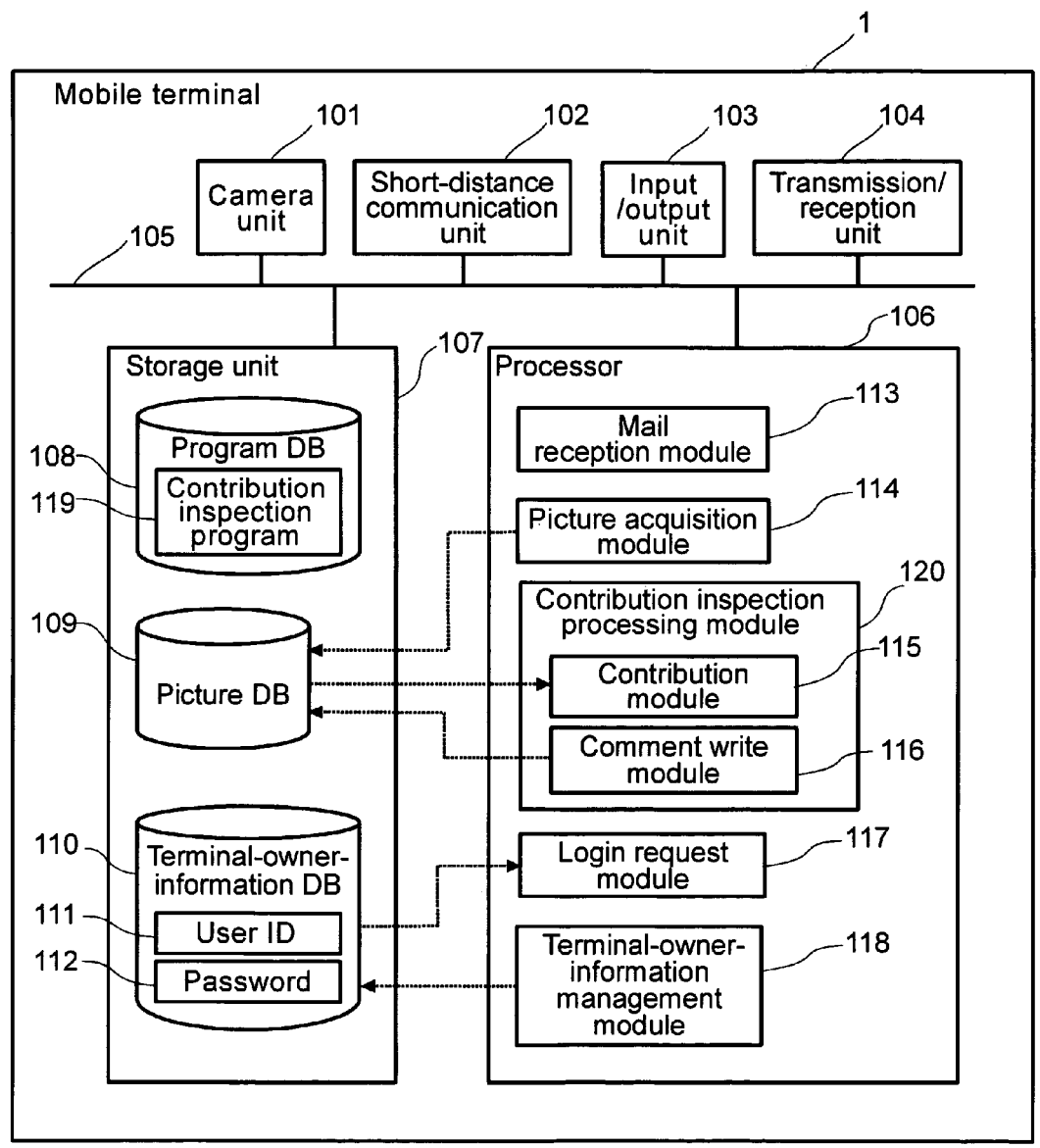
FIG. 2 is a diagram showing an internal configuration of the mobile terminal.

FIG. 2 is a diagram showing details of the mobile terminal 1.

The mobile terminal 1 comprises an input/output unit 103, a processor 106, a storage unit 107, a transmission/reception unit 104, a camera unit 101 and a short-distance communication unit 102, which are connected to each other by an internal bus 105 so that the input/output unit 103, the processor 106, the storage unit 107, the transmission/reception unit 104, the camera unit 101 and the short-distance communication unit 102 are capable of exchanging information such as control signals and data with each other. The input/output unit 103, the processor 106, the storage unit 107, the transmission/reception unit 104, the camera unit 101 and the short-distance communication unit 102 are connected to a battery or a power supply for providing necessary electric power. Neither the battery nor the power supply is shown in the figure though.

The camera unit 101 is a component for taking a picture. The short-distance communication unit 102 is a component for carrying out a short-distance communication with an external apparatus. Used as a unit for storing information, the storage unit 107 is typically implemented by a hard disc or the like. The input/output unit 103 is a component for displaying information to the user and receiving data entered by the user. The input/output unit 103 typically includes a liquid crystal display device and a ten-key board. However, the input/output unit 103 is not limited to the liquid crystal display device and the ten-key board. That is to say, the input/output unit 103 can be any component as long as the component is capable of receiving an input entered by the user and displaying an output to the user. The input/output unit 103 can also have a configuration comprising an input unit and an output unit physically separated from the input unit. The transmission/reception unit 104 is a component for controlling a communication with the mobile-terminal network 4 in order to receive data from the mobile-terminal network 4 and pass on the data to the processor 106. The transmission/reception unit 104 also receives data from the processor 106 to be transmitted to the mobile-terminal network 4. It is to be noted that the transmission/reception unit 104 shown in the figure as a unit for transmitting and receiving data to and from the mobile-terminal network 4 can also have a configuration comprising a reception unit and a transmission unit physically separated from the reception unit.

The storage unit 107 employed in the mobile terminal 1 is used for storing a program DB 108, a picture DB 109 and a terminal-owner-information DB 110. The program DB 108 of the mobile terminal 1 includes a contribution inspection program 119 for implementing a contribution inspection function. The picture DB 109 is a database for preserving a picture taken by the camera unit 101 or a picture downloaded from the display terminal 2. The terminal-owner-information DB 110 is a database for storing a user ID 111 and a password 112, which are required when the user starts use of the mobile terminal 1 in the electronic notice-board system.

Figure 3:
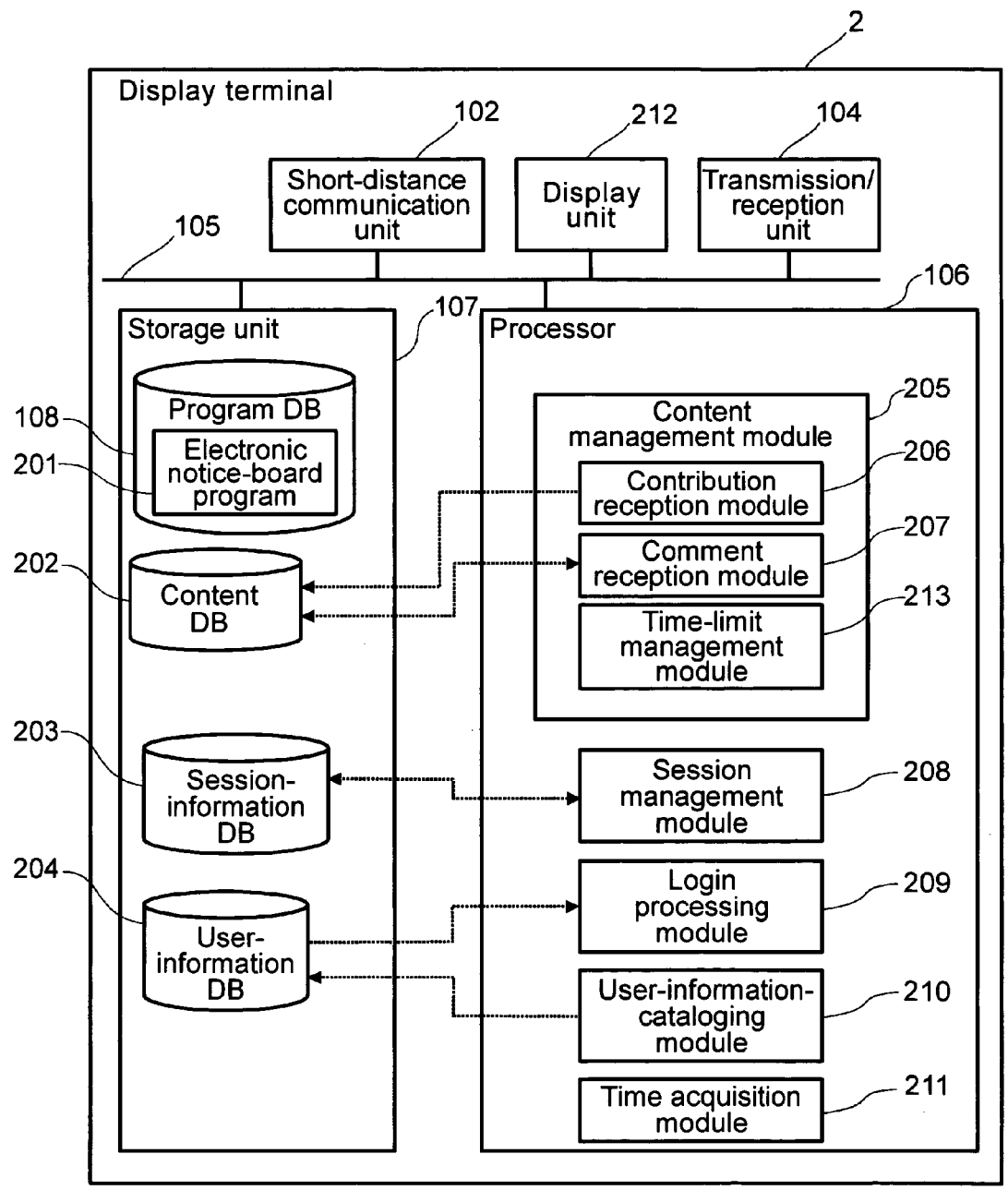
FIG. 3 is a diagram showing an internal configuration of the display terminal.

FIG. 3 is a diagram showing details of the display terminal 2.

The display terminal 2 comprises a display unit 212, a processor 106, a storage unit 107, a transmission/reception unit 104 and a short-distance communication init 102, which are connected to each other by an internal bus 105 allowing the display unit 212, the processor 106, the storage unit 107, the transmission/reception unit 104 and the short-distance communication init 102 to exchange information such as control signals and data with each other. The display unit 212, the processor 106, the storage unit 107, the transmission/reception unit 104 and the short-distance communication init 102 are connected to a battery or a power supply for providing necessary electric power. Neither the battery nor the power supply is shown in the figure though.

The short-distance communication unit 102 is a component for carrying out a short-distance communication with an external apparatus. Used as a unit for storing information, the storage unit 107 is typically implemented by a hard disc or the like. The display unit 212 is a component serving as a notice board for displaying information. An example of the display unit 212 is a liquid crystal display device with a large size. However, the display unit 212 does not have to be such a liquid crystal display device. That is to say, the display unit 212 can be any display device as long as the display device is capable of displaying information. The transmission/reception unit 104 is a component for controlling a communication with the network 3 in order to receive data from the network 3 and pass on the data to the processor 106. The transmission/reception unit 104 also receives data from the processor 106 to be transmitted to the network 3. It is to be noted that the transmission/reception unit 104 shown in the figure as a unit for transmitting and receiving data to and from the network 3 can also have a configuration comprising a reception unit and a transmission unit physically separated from the reception unit.

The storage unit 107 employed in the display terminal 2 is used for storing a program DB 108, a content DB 202, a session-information DB 203 and a user-information DB 204. The program DB 108 of the display terminal 2 includes an electronic notice-board program 201 for implementing an electronic notice-board function. The content DB 202 is a database for storing a picture content contributed from a mobile terminal 1, a comment made by an inspector and a content management table 501. The session-information DB 203 is a database for storing session information for a mobile terminal 1, which is presently in a login state. The user-information DB 204 is a database for storing a list of users utilizing the electronic notice-board system.

By using a read unit shown in none of the figures, the contribution inspection program 119 is stored in the storage unit 107 employed in the mobile terminal 1 when the mobile terminal 1 is made. Similarly, by using a read unit shown in none of the figures, the electronic notice-board program 201 is stored in the storage unit 107 employed in the display terminal 2 when the display terminal 2 is made. The contribution inspection program 119 and/or the electronic notice-board program 201 may each be traded as a program stored in a storage medium such as a CD-ROM. In this case, the contribution inspection program 119 and/or the electronic notice-board program 201 are transferred from the storage medium to the storage unit 107 by using read unit shown in none of the figures. As another alternative, the contribution inspection program 119 and/or the electronic notice-board program 201 may each be traded as a program available in the network 3 or the mobile-terminal network 4. In this case, the contribution inspection program 119 and/or the electronic notice-board program 201 are downloaded from the network 3 or the mobile-terminal network 4 to the storage unit 107 by using read unit shown in none of the figures. The contribution inspection program 119 or the electronic notice-board program 201 is the loaded serially from the storage unit 107 to a work memory to be executed by the processor 106.

The contribution inspection program 119 is divided into the following functional blocks. A mail reception module 113 is a module for receiving an email from the display terminal 2. A picture acquisition module 114 is a module for controlling the camera unit 101, acquiring a picture and storing data of the picture into the picture DB 109. A contribution inspection processing module 120 comprises a contribution module 115 and a comment write module 116. The contribution module 115 is a module for contributing a picture to a notice board. The comment write module 116 is a module for writing a comment into a notice board. A login request module 117 is a module for carrying out a process to log in the mobile terminal 1 into the display terminal 2 through the short-distance communication unit 102. A terminal-owner-information management module 118 is a module for cataloging information on a terminal owner in the terminal-owner-information DB 110 and updating the terminal-owner-information DB 110.

The electronic notice-board program 201 is divided into the following functional blocks. A session management module 208 is a module for managing login states of mobile terminals 1. A login-processing module 209 is a module for processing a login request received from a mobile terminal 1. A content management module 205 comprises a contribution reception module 206, a comment reception module 207 and a time-limit management module 213. The contribution reception module 206 is a module for processing a contribution request received from the mobile terminal 1. The comment reception module 207 is a module for processing a comment write request received from the mobile terminal 1. The time-limit management module 213 is a module for monitoring the time limit of each content and erasing a content reaching its time limit from a display screen. A user-information-cataloging module 210 is a module for cataloging information on a user in the user-information DB 204 and updating the user-information DB 204. A time acquisition module 211 is a module for acquiring the present time and providing the present time to the other functional modules of the electronic notice-board program 201.

FIG. 4 is a diagram showing the data structure of a user information table 401 stored in the user-information DB 204. A mail address 401 is a destination address used in sending an email to the user of the mobile terminal 1.

FIG. 5 is a diagram showing the data structure of a content management table 501 stored in the content DB 202. A content ID 502 is an ID for uniquely identifying a content displayed on the display unit 212. A user ID 111 is an ID for identifying a user contributing the content. A display time limit 503 is a time at which the content is to be erased from the display unit 212.

FIG. 6 is a diagram showing the data structure of a session management table 601 stored in the session-information DB 203. A session ID 602 is a temporary ID, which is assigned to the mobile terminal 1 when the mobile terminal 1 is authenticated successfully. A web session ID 604 is a temporary ID, which is assigned to the mobile terminal 1 as an ID for making access to the display terminal 2 through the network 3. A no-access lapsing time 603 is a period of time lapsing since the last access made by the mobile terminal 1 corresponding to the session ID 602 or the web session ID 604.

Prior to use of the electronic notice-board system, the terminal-owner-information DB 110 and the user-information DB 204 are initialized. The terminal-owner-information management module 118 initializes the terminal-owner-information DB 110 by cataloging information on users in the terminal-owner-information DB 110. The user-information-cataloging module 210 initializes the user-information DB 204 by cataloging information on users in the user-information DB 204. The information on users is received from the user-information-cataloging module 210 through a communication by way of the network 3 and the mobile-terminal network 4. As an alternative, a person in charge of the management of the display terminal 2 initializes the display terminal 2 by cataloging information on users in advance in the display terminal 2 by using another means. Similarly, a person in charge of the management of the mobile terminal 1 initializes the mobile terminal 1 by cataloging information on users in advance in the mobile terminal 1 by using another means.

Figure 7:
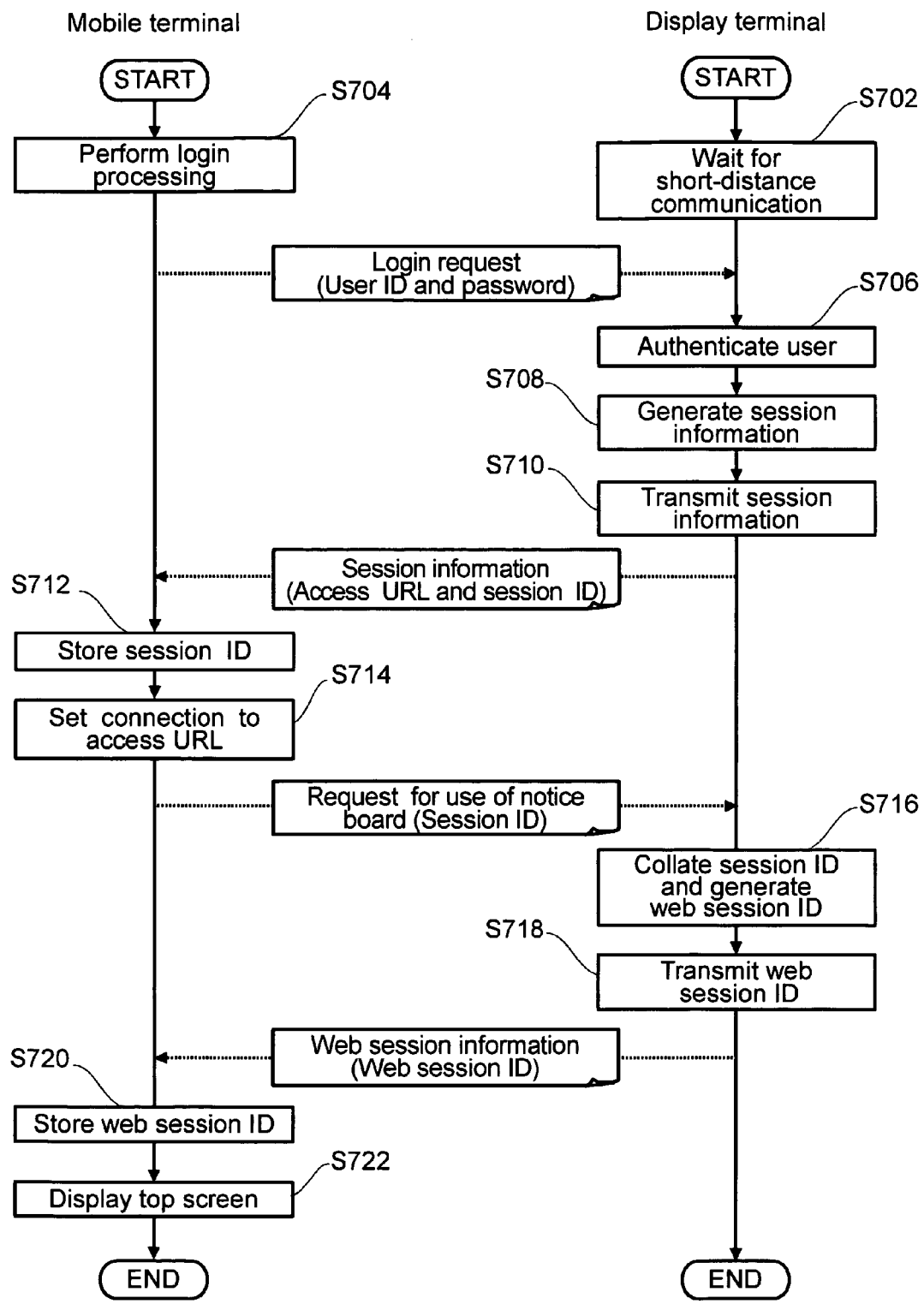
FIG. 7 shows a flowchart representing the execution procedure of a login process.

Referring to a flowchart shown in FIG. 7, the following description explains a login procedure of a contributor/inspector using the electronic notice board.

At a step S702, the login-processing module 209 employed in a display terminal 2 controls the short-distance communication unit 102, waiting for a request for a login to arrive from a mobile terminal 1. The user issues a request for a login through the short-distance communication unit 102 employed in a mobile terminal 1 close to a notice board provided by the display terminal 2 as a notice board, which the user wants to use. At a step S704, the login request module 117 employed in the mobile terminal 1 retrieves the user ID 111 and password 112 of the user from the terminal-owner-information DB 110 and transmits the user ID 111 and the password 112 to the display terminal 2 as a request for a login. At a step S706, the login-processing module 209 employed in the display terminal 2 receives the request for a login and collates the user ID 111 and password 112 included in the request with the user-information DB 204 in order to authenticate the user as a registered user. If the user is found to be a valid user, at the next step S708, the session management module 208 generates a random ID and catalogs the random ID in the session management table 601 as a session ID 602. The session ID 602 is associated with the user ID 111 and the no-access lapsing time 603 is set at 0. Thereafter, the session management module 208 manages the lapse of time, updating the no-access lapsing time 603. If no access is made in a predetermined period of time, the entry of the session ID 602 is deleted from the session management table 601 in order to log out the user forcibly.

Figure 11:
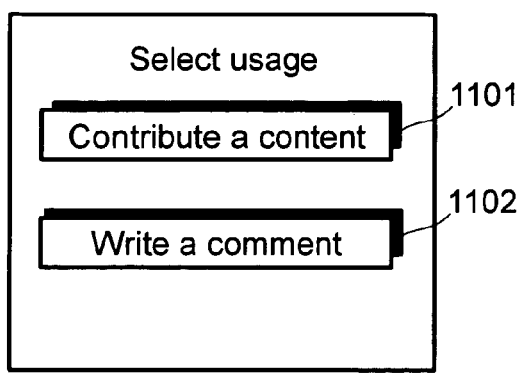
FIG. 11 is a diagram showing a typical display screen of a top screen of a mobile terminal.

Then, at the next step S710, the login-processing module 209 employed in the display terminal 2 transmits information on a session to the mobile terminal 1 in response to the request for a login. The information on a session includes a URL of the display terminal 2 and the generated session ID 602. The URL will be used by the mobile terminal 1 in making access to the display terminal 2 by way of the mobile-terminal network 4. At a step S712, the login request module 117 employed in the mobile terminal 1 receives the information on a session and stores the information in a work memory. Then, at the next step S714, the login request module 117 establishes a connection to the access URL through the transmission/reception unit 104 and transmits the session ID 602 to the display terminal 2 by way of the mobile-terminal network 4 as a request to use a notice board. The login-processing module 209 receives the request to use a notice board. At a step S716, the session management module 208 employed in the display terminal 2 receives the session ID 602 and collates the session ID 602 with the session management table 601. If the session ID 602 is a session ID already cataloged in the session management table 601, the session management module 208 generates a random ID to be used as a web session ID 604 and adds the web session ID 604 to the session management table 601. Then, at the next step S718, the login-processing module 209 transmits information on a web session to the mobile terminal 1. At a next step S720, the login request module 117 employed in the mobile terminal 1 receives the information on a web session and stores the information in a work memory. Then, at the next step S722, the contribution inspection processing module 120 displays a contribution/inspection top screen through the input/output unit 103. FIG. 11 is a diagram showing a typical display screen of the top screen. The top screen of FIG. 11 shows a display area 1101 to be selected for contributing a content and a display area 1102 to be selected for making a comment.

Figure 8:
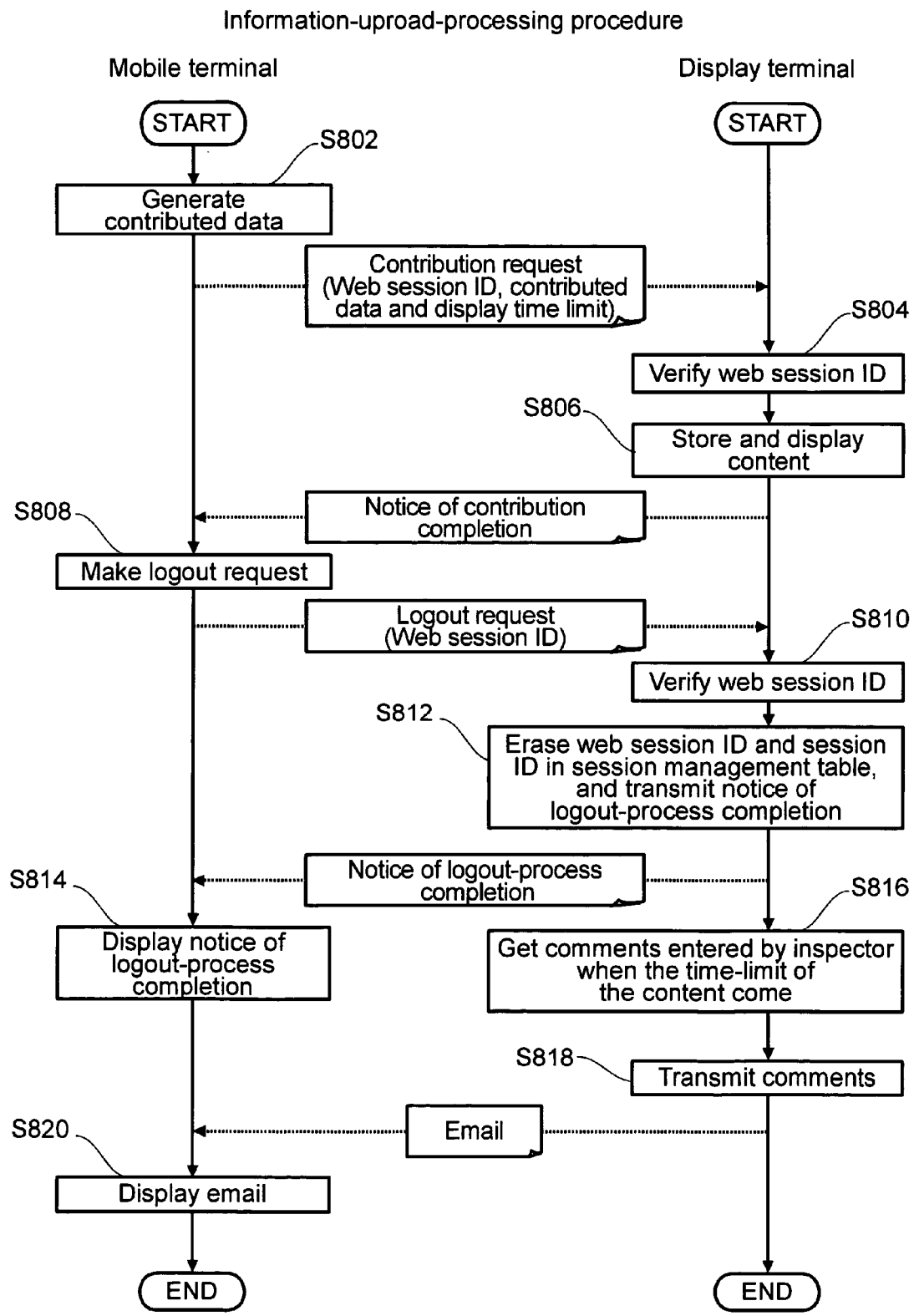
FIG. 8 shows a flowchart representing the execution procedure of a picture contribution process.

Referring to a flowchart shown in FIG. 8, the following description explains a procedure to be followed by a contributor to contribute a content to a notice board. It is to be noted that, before this procedure is started, the login procedure comprising the steps S702 to S722 has been completed.

Figure 12:
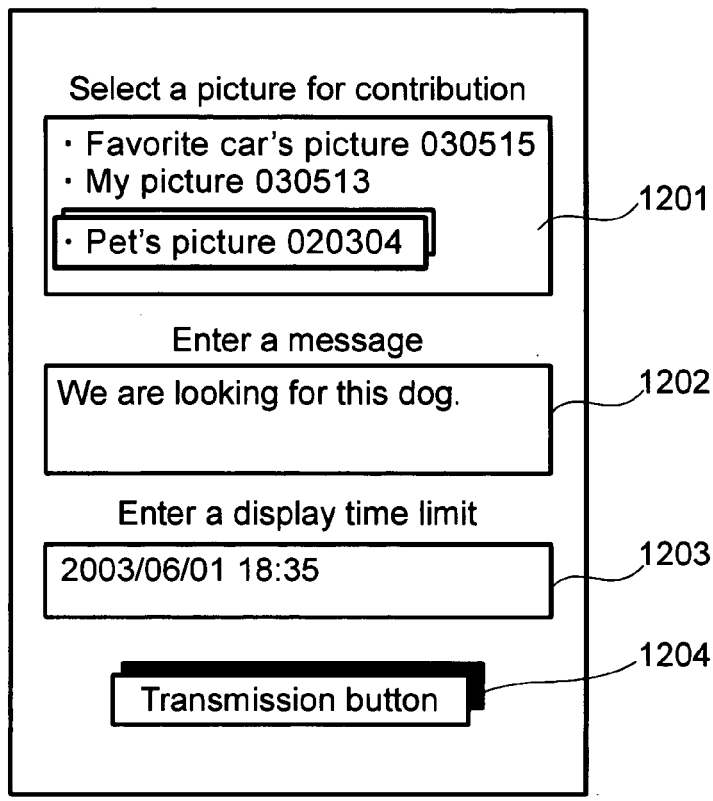
FIG. 12 is a diagram showing a typical display screen of a process to create contributed data.

First of all, the user of the mobile terminal 1 selects an operation to contribute a content to a notice board by operating the input/output unit 103 to select the display area 1101 appearing on the top screen displayed at the step S722 as described above. The contribution module 115 displays a select field, a message field and a display time-limit field of a picture list stored in the picture DB 109 on the input/output unit 103. FIG. 12 is a diagram showing a typical display screen of the fields 1201, 1202 and 1203 in a process to create a contributed content. The user then selects a picture to be contributed from the select field 1201 and enters a message to the message field 1202. Subsequently, the user enters a display time limit to the display time-limit field 1203. Finally, the user selects a transmission button 1204 to generate contributed data. At a step S802, the user transmits a request to display a contribution to the display terminal 2 from the transmission/reception unit 104. The request to display a contribution comprises data of the selected picture, the message, the display time limit and the web session ID 604. The data of the selected picture, the message and the display time limit are inputs entered by the user as described above. At a step S804, the contribution reception module 206 employed in the display terminal 2 receives the request to display a contribution from the transmission/reception unit 104 of the display terminal 2, and passes on the request to the session management module 208. The session management module 208 collates the web session ID 604 included in the request to display a contribution with the session management table 601. If the web session ID 604 is found valid, the no-access lapsing time 603 is reset back to 0. The contribution reception module 206 preserves the picture data in the content DB 202, updating the content management table 501. At that time, a random ID is generated as a content ID 502 whereas the user ID 111 is acquired from the session management table 601. The display time limit included in the request to display a contribution is used as the time limit of the displayed contributed picture. Then, at the next step S806, the contribution reception module 206 displays the picture data, the message and the content ID 502 on the notice board appearing in the display unit 212 and, then, transmits a notice of completion of the operation to display the contribution to the mobile terminal 1. Receiving the notice of completion of the operation to display the contribution at a step S808, the contribution module 115 employed in the mobile terminal 1 transmits a web session ID 604 to the display terminal 2 as a request for a logout. At a step S810, the session management module 208 employed in the display terminal 2 receives and verifies the web session ID 604. If the web session ID 604 is found valid, the entry of the web session ID 604 is deleted from the session management table 601. Then, at the next step S812, the session management module 208 transmits a notice of completion of a logout process to the mobile terminal 1. At a step S814, the content management module 205 employed in the mobile terminal 1 displays the notice of completion of a logout process on the input/output unit 103 to the user. In the mean time, as the display time limit is reached at a step S816, the time-limit management module 213 employed in the display terminal 2 acquires comments written by an inspector into the content so far from the content DB 202. Then, at the next step S818, the time-limit management module 213 transmits the comments to the contributor of the content as a mail sent to the mobile terminal 1 by way of the transmission/reception unit 104 employed in the display terminal 2. At a step S820, the mail reception module 113 employed in the mobile terminal 1 displays the contents of the mail on the input/output unit 103 to the user.

Figure 9:
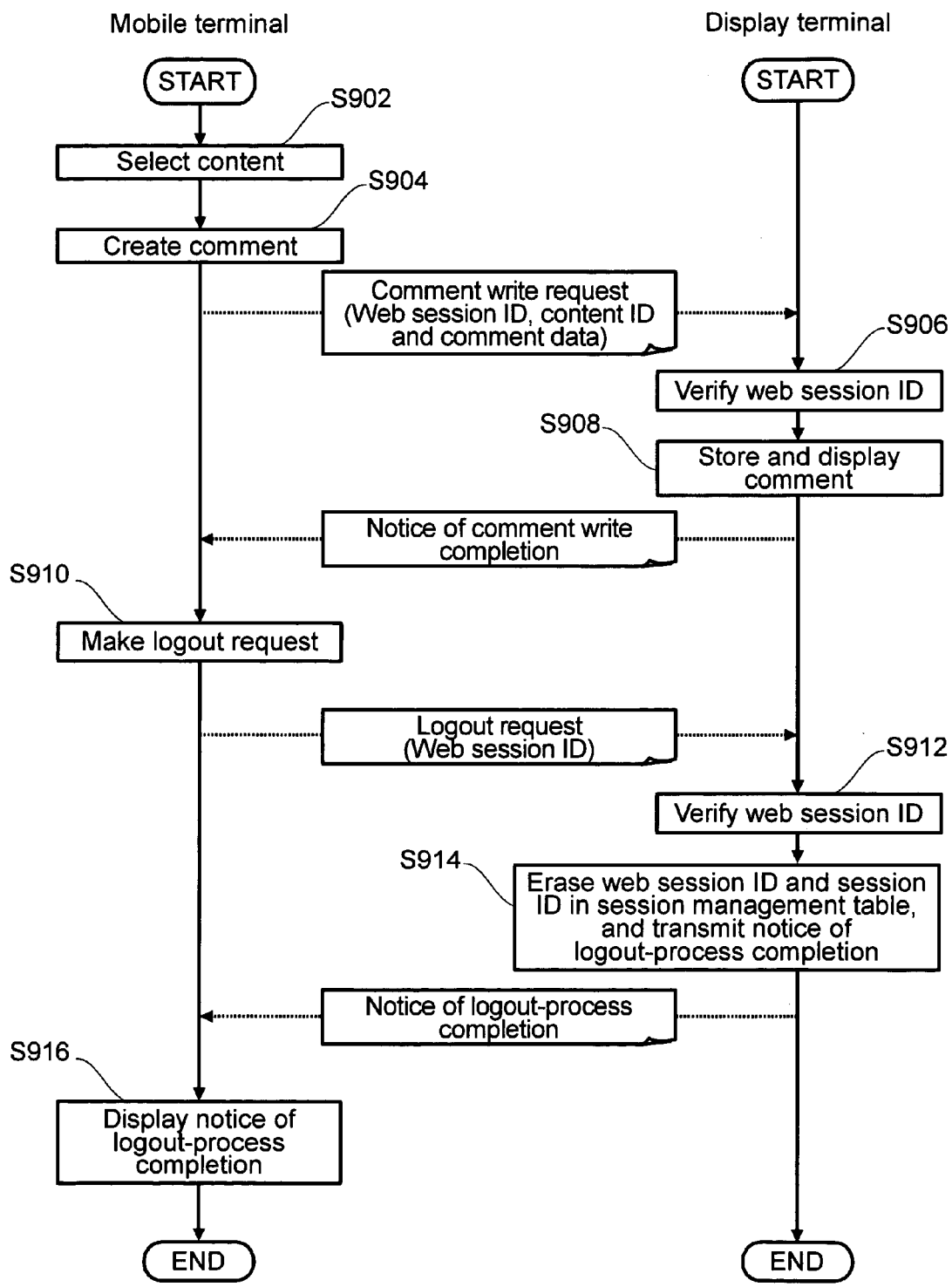
FIG. 9 shows a flowchart representing the execution procedure of a comment-writing process.

Referring to a flowchart shown in FIG. 9, the following description explains a procedure followed by an inspector to write a comment into a content. It is to be noted that, before this procedure is started, the login procedure comprising the steps S702 to S722 has been completed.

Figure 13:
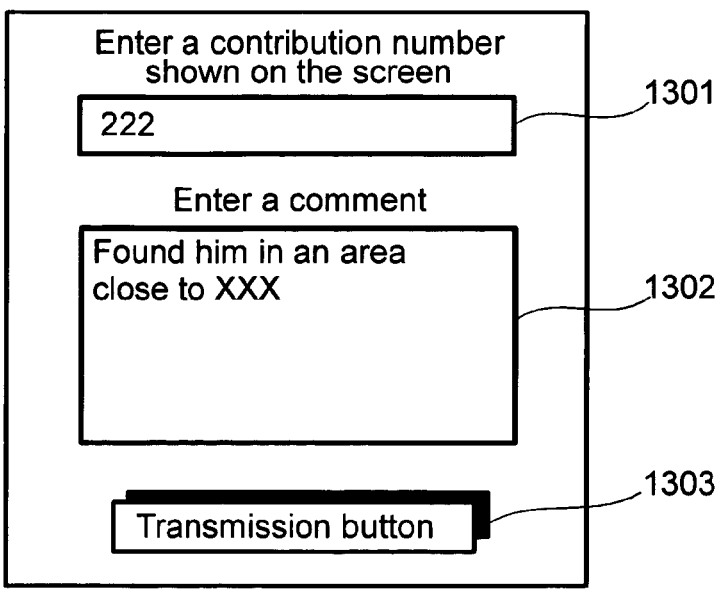
FIG. 13 is a diagram showing a typical display screen of a process to create a comment.

First of all, by operating the input/output unit 103 to select the display area 1102 appearing on the top screen displayed at the step S722 as described above, the user of the mobile terminal 1 selects an operation to write a comment into a content displayed on a notice board. The comment write module 116 then displays a display field for entering a content ID 502 and a display field for writing a comment. FIG. 13 is a diagram showing the display fields 1301 and 1302 on a typical display screen of a process to write a comment. Subsequently, the user enters a content ID 502 to the display field 1301 and writes a comment into the display field 1302. The content ID 502 is an ID identifying a content for which the comment is written. The content ID 502 is selected from those appearing on the display unit 212 employed in the display terminal 2. Finally, the user selects a transmission button 1303 to start a process to select the content and input the written comment. As the user selects the transmission button 1303, the procedure begins with a step S902 to acquire the content ID 502 entered to the display field 1301 displayed by the comment write module 116 as described above. Then, at the next step S904, the comment write module 116 transmits a request to write a comment to the display terminal 2 by way of the transmission/reception unit 104. The request to write a comment includes a web session ID 604, the content ID 502 and data of the entered comment. At a step S906, the comment reception module 207 employed in the display terminal 2 receives the request to write a comment through the transmission/reception unit 104. Then, the session management module 208 authenticates the web session ID 604 included in the request to write a comment. If the web session ID 604 is found valid, the no-access lapsing time 603 is reset back to 0. Then, at the next step S908, the comment reception module 207 adds the data of the comment to a content stored in the content DB 202 as a content identified by the content ID 502 included in the request to write a comment. The content is also displayed on the electronic notice board by way of the display unit 212. Finally, the comment reception module 207 transmits a notice of completion of the process to write the comment to the mobile terminal 1.

Since operations carries out at steps S910 to S916 are the same as those carried out at the steps S808 to S814 respectively, no descriptions of the steps S910 to S916 are given.

Figure 10:
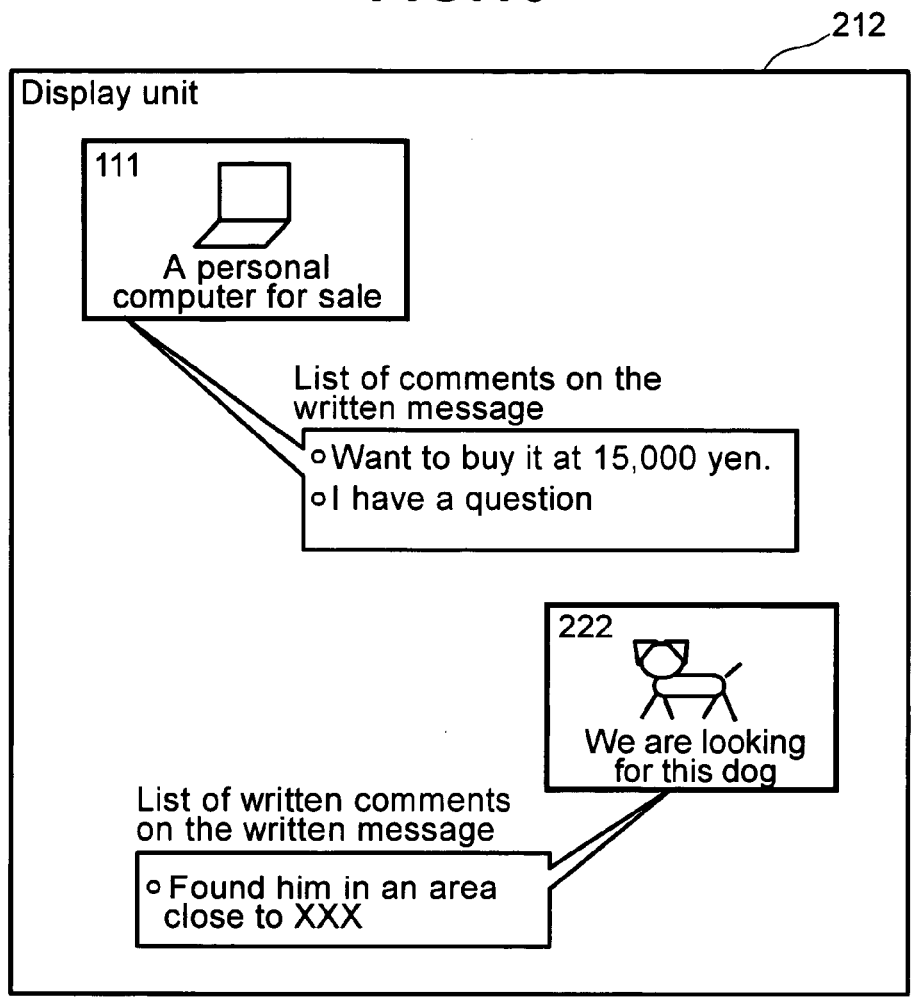
FIG. 10 is a diagram showing a typical display screen of a notice board.

FIG. 10 is a diagram showing a typical display screen of an electronic notice board displayed on the display unit 212 employed in the display terminal 2 provided by the present invention.

In the electronic notice-board system comprising mobile and display terminals 1 and 2 implemented by the embodiment, the user is capable of specifying a desired display terminal 2 by using the short-distance communication means 6 from a mobile terminal 1. In addition, since the session ID 602 for use with the short-distance communication means 6 is associated with a web session ID 604 for use with the mobile-terminal network 4, it is possible to verify that a communication through the short-distance communication means 6 and a communication through the mobile-terminal network 4 are both carried out by the same mobile terminal 1.

In this embodiment, a picture is used as an example of a contributed content. However, the contributed content is not limited to a picture. That is to say, any other information such as an inquiry or an announcement can also be used as a contributed content as long as the information can be displayed on an electronic notice board. In addition, while the session ID 602 for use with the short-distance communication means 6 is an ID different from the web session ID 604 for use in a communication through the mobile-terminal network 4 in this embodiment, a common ID can also be used as a substitute for the session ID 602 and the web session ID 604. Moreover, while the mobile terminal 1 employed in this embodiment is a terminal having both the contribution function and the function to write a comment, a terminal provided with only one of the functions can also be used.

In accordance with the present invention, it is possible to implement an electronic notice board in an electronic notice-board system that allows authentication of a user by using a short-distance communication to be used as an operation to start the use of the electronic notice board. Thus, the start of the use of a nearby electronic notice board can be specified intuitively as well as easily. In addition, since users of the electronic notice board are limited exclusively to users close to the electronic notice board, it is possible to avoid improper use of the electronic notice board by any user located at a long distance from the electronic notice board.

What is claimed is:

1. An information-processing terminal comprising:
an input unit for receiving an input entered by a user;
a first short-distance communication unit for carrying out a short-distance communication with a display apparatus; and
a second communication unit for carrying out a communication with said display apparatus through a network;
wherein
said first short-distance communication unit using said input, carries out an authentication process for allowance to use said display apparatus;
said second communication unit carries out data exchange with said display apparatus if said authentication process is affirmed; and
said second communication unit does not carry out data exchange with said display apparatus if said authentication process is not affirmed.

2. An information-processing terminal according to claim 1, wherein said information-processing terminal has a function of contributing data to said display apparatus and a function of adding a comment to contributed data.

3. An information-processing terminal according to claim 2, further comprising means for selecting an object displayed on said display apparatus.

4. A display apparatus for presenting information to users surrounding said display apparatus, comprising:
a first short-distance communication unit for carrying out a short-distance communication with an information-processing terminal; and
a second communication unit for carrying out a communication with said information-processing terminal through a network;
wherein
said first short-distance communication unit carries out an authentication process for allowance to use said information-processing terminal:
said second communication unit carries out data exchange with said information-processing terminal if said authentication process is affirmed; and
said second communication unit does not carry out data exchange with said information-processing terminal if said authentication process is not affirmed.

5. A display apparatus according to claim 4 wherein a process is carried out to associate information on a communication establishment between said first short-distance communication unit and said information-processing terminal with information on a communication establishment between said second communication unit and said information-processing terminal.

6. An electronic notice-board system including a display apparatus according to claim 4 wherein said display apparatus is an electronic notice board.

7. An electronic notice-board system including a display apparatus according to claim 5 wherein said display apparatus is an electronic notice board.

* * * * *